Figure 1:
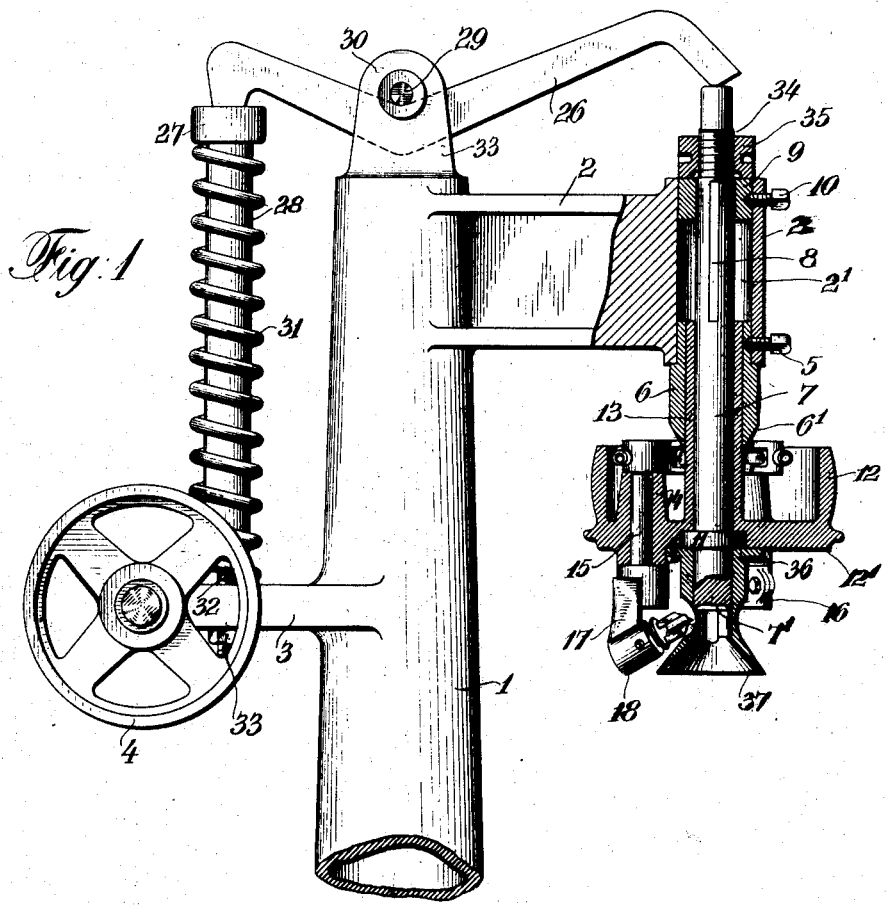

A. L. WEISSENTHANNER.
BOTTLE SEALING MACHINE.
APPLICATION FILED JULY 12, 1906.

907,205.

Patented Dec. 22, 1908.
2 SHEETS—SHEET 1.

A. L. WEISSENTHANNER.
BOTTLE SEALING MACHINE.
APPLICATION FILED JULY 12, 1906.
907,205.
Patented Dec. 22, 1908.
2 SHEETS—SHEET 2.
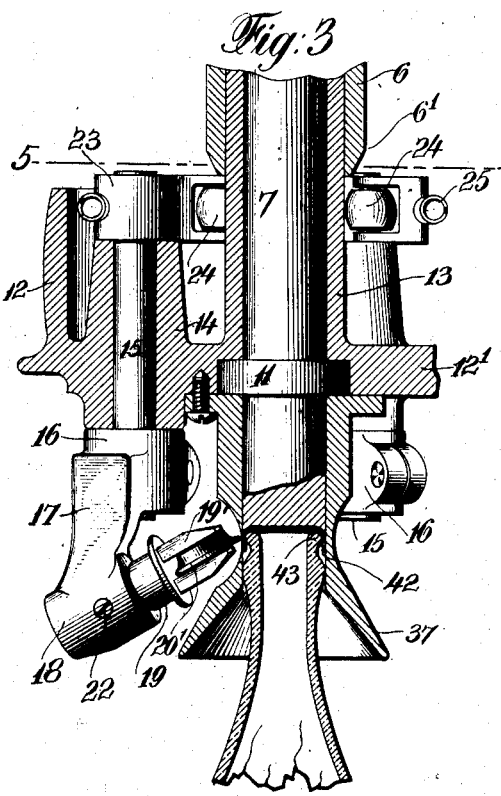
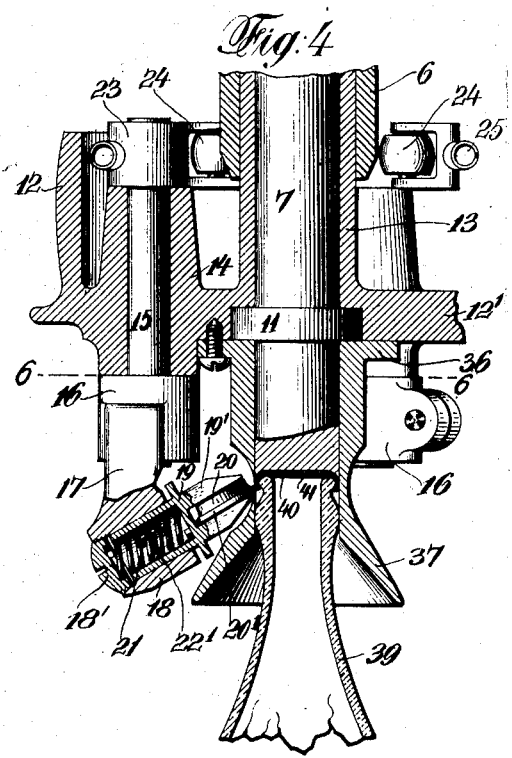
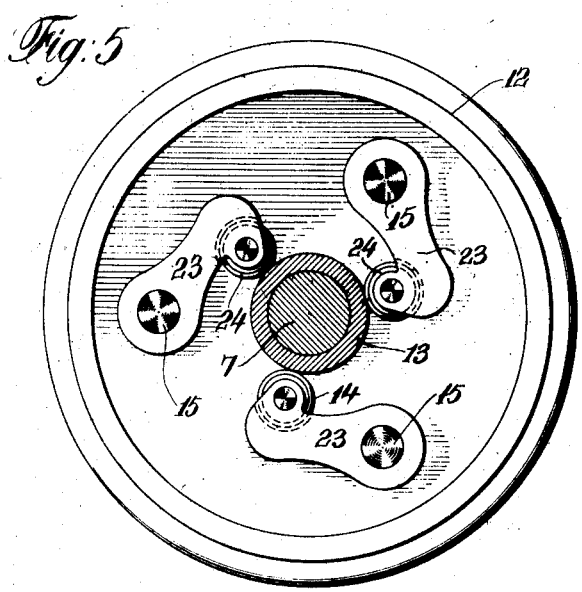
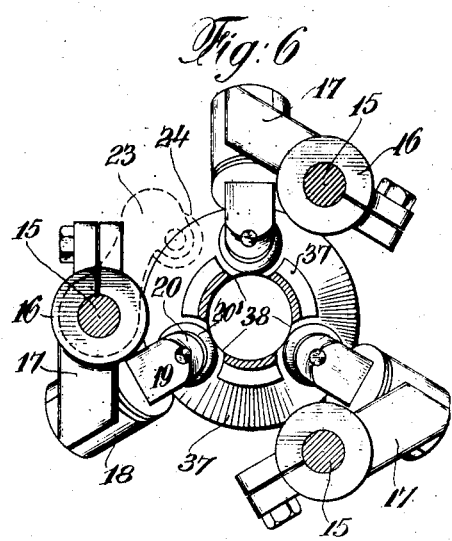

UNITED STATES PATENT OFFICE.

ALFRED L. WEISSENTHANNER, OF NEW YORK, N. Y.

BOTTLE-SEALING MACHINE.

No. 907,205.       Specification of Letters Patent.       Patented Dec. 22, 1908.

Application filed July 12, 1906. Serial No. 325,887.

*To all whom it may concern:*

Be it known that I, ALFRED L. WEISSENTHANNER, a citizen of the Republic of France, residing at New York city, in the county of New York and State of New York, have invented certain new and useful Improvements in Bottle-Sealing Machines, of which the following is a specification.

In certain types of bottle sealing machines the sealing or flange bending tool, usually in the form of a roller, is made to operate against the cap flange in a horizontal plane, the pressure being so applied as to cause the sealing tool to bear against the under side of the shoulder on the bottle head. This frequently results in ineffective sealing due to the grinding action of the roller on the cap flange which drives the metal forward and causes it to buckle. These rollers in operation strike the bottle immediately under the shoulder thereon and in the absence of any provision for vertical adjustment they are not adapted to the efficient sealing of bottles which vary in height or in depth of shoulder.

The purpose of the present invention is to construct a machine which shall be capable of effective sealing under all conditions of variations in height of bottles, width of mouths, and thickness and depth of shoulders, without any lamination, stretching or buckling of the metal flange. In the embodiment of the invention herein described this purpose is accomplished by mounting one or more sealing tools, in the form of rollers having a flange constituting the working edge, in a plane at an angle to a horizontal plane. The support which carries the sealing tool is yieldingly mounted to permit of a movement of said tool in its plane toward and away from the bottle head, and the tool itself is revolubly mounted on a stud the axis of which is at right angles to the direction of the application of the sealing force. By such construction the working edge of the sealing tool is enabled to bear against the cap flange in a plane at an angle to a horizontal plane. Provision is made for rotating the sealing tool about the bottle head said tool, however, moving in a fixed plane determined by the initial working position of the sealing tool, although by this is meant to include any slight deviation from said plane due to inequalities in the bottle shoulder which may be met with in the circumferential travel of the sealing tool. As here constructed the sealing tool is carried by a pulley having a bearing on a longitudinally movable spindle the lower end of which constitutes a chuck to receive the bottle. When the bottle is forced into the chuck the spindle is raised carrying with it the pulley and sealing tool, so that as the relative positions of the spindle and sealing tool always remain the same, so far as vertical adjustment is concerned, the latter will be carried to its proper position for sealing whatever the height of the bottle may be.

The invention will be understood by reference to the accompanying drawings in which—

Figure 2:
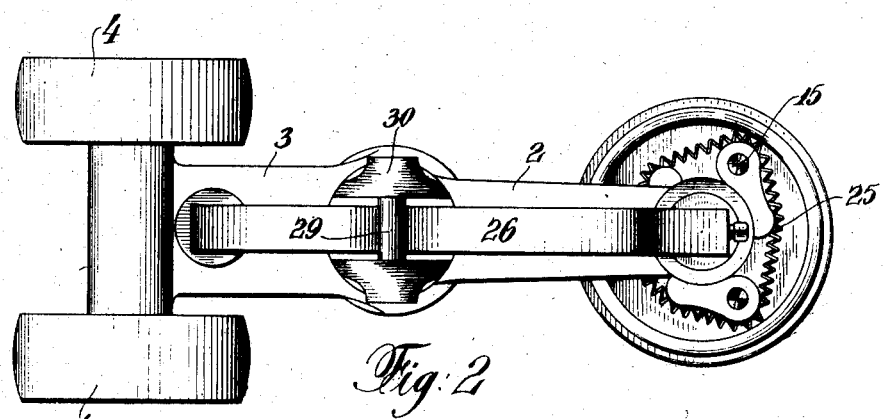

Figure 1 is a view partly in elevation and partly in vertical section of a sealing machine head embodying my invention. Fig. 2 is a plan view of the same; Fig. 3 a vertical section on an enlarged scale of a portion of the mechanism of Fig. 1, illustrating the relative positions of the parts immediately before the sealing operation. Fig. 4 is a view similar to Fig. 3 showing the parts in position during the sealing operation. Fig. 5 is a horizontal section on the plane of the line 5—5 of Fig. 3 and Fig. 6 a horizontal section on the plane of the line 6—6 of Fig. 4.

Similar reference numerals indicate similar parts in the several views.

Referring to the drawings the numeral 1 designates the upper part of the frame of the machine in the form of a casting having integral therewith laterally projecting brackets 2 and 3. The latter is formed with a transverse head bored longitudinally to receive a shaft on which pulleys 4—4 are mounted. A belt (not shown) driven from a suitable power shaft passes around said pulleys and around pulley 12 for the purpose of rotating the latter.

The bracket 2 near its outer end has a vertical bore 2' as indicated in Fig. 1, and held therein by suitable means, as a screw 5, is a sleeve 6 the lower part of which is beveled at 6' to constitute a cam. Extending centrally through the opening in bracket 2 is a spindle 7 which is longitudinally movable but held against rotation by a spline 8 thereon engaging a groove in a collar 9. The latter is held in its seat in the upper part of the opening 2' by a screw 10 or other suitable means. Near its lower end the spindle 7 is provided with a collar 11, and surrounding said spindle and bearing on collar 11 is a pulley 12. The latter has a centrally disposed integral annular flange 13 rising from the web 12' and extending upwardly into the opening 2' of bracket 2 between spindle 7 and the cone cam 6. Spindle 7 passes through the flange 13 without binding thereon.

The pulley 12, in the embodiment of the invention illustrated, carries three sealing rollers and as these are mounted in a similar manner it will only be necessary to specifically describe one of them. It may be stated here that I do not limit myself to the exact number of sealing rollers shown as a greater or less number may be employed. Projecting upwardly from the web 12' of pulley 12 is a stud or nipple 14 bored longitudinally to provide a bearing for a vertical spindle 15. Clamped to the lower projecting end of spindle 15 is a split collar 16 constituting part of a casting which also comprises a depending arm 17 having a head 18 disposed at an angle thereto. The said head is bored longitudinally, as indicated in Fig. 4, and is adapted to receive an open ended cylindrical casing 19 constituting a support for a sealing tool in the form of a roller 20, said roller being revolubly mounted on a stud carried by a bifurcated head 19' of the support 19. The outer end of the head 18 is closed by a screw cap 18', and between said cap and the end wall of the support 19 is a spring 21 adapted to be compressed when the sealing roller bears against the cap flange.

While the roller support has longitudinal movement in the head 18 any rotary movement therein is prevented by a stud 22 passing through said head and engaging the walls of a longitudinal slot 22' (see Fig. 4) in the wall of said support. On the upper end of spindle 15 is fixed a laterally projecting arm 23, said arm being bifurcated at its outer end to receive a shoe 24 in the form of a roller revolubly mounted on a stud. As shown in the drawings the split collar 16 bears against a shoulder on the under side of the web 12' of pulley 12, and arm 23 rests upon the upper end of stud 14, so that when spindle 7 is raised, as hereafter described, pulley 12 and the parts carried thereby will be raised to cause the shoe 24 to ride over the face 6' of the cone cam to thereby bring the sealing roller into operative position. A spring 25 (see Fig. 2) encircles the several arms 23 and acts against the outer ends thereof to keep them pressed inwardly. The sealing roller 20 as shown in the drawings is provided with a circumferential flange 20' constituting the working edge which is made slightly rounded.

Bearing upon the upper end of spindle 7 is the long arm of a lever 26, the other arm of said lever resting in a seat formed by a collar 27 on the upper end of a vertical spindle 28. The lever 26 is bent as shown in Fig. 1 and is fulcrumed at the bend against a stud 29 fixed in the bifurcated head 30 of frame 1. The reduced lower end 32 of spindle 28 (see Fig. 1) passes through an opening in bracket 3 to permit of the longitudinal movement of said spindle. Surrounding spindle 28 and bearing between bracket 3 and collar 27 is a spring 31 which exerts an upward pressure on the short arm of lever 26 to hold spindle 7 normally in the position shown in Fig. 1, and to exert a downward pressure on the cap during the sealing operation. This pressure in practice is from 900 to 1,000 pounds. The reduced end 32 of said spindle may be threaded to receive a nut 33 the purpose of which is to draw spindle 28 downwardly to enable the placing of lever 26 in position or its removal when necessary. The upper end of spindle 7 is threaded at 34 to receive a nut 35. The latter bears upon the fixed collar 9 or upon the bracket 2 and thus limits the downward movement of spindle 7.

Secured to the under side of web 12' of pulley 12 is a depending guide for the bottle to be capped. Said guide is flared outwardly at its lower end as indicated at 37, and the neck thereof formed with suitable openings 38 to permit entrance of the sealing rollers 20 to bear upon the cap flange.

The operation of the machine above described is as follows. The bottle to be capped, a portion of the neck 39 of which is shown in Figs. 3 and 4, has placed thereon by hand or automatically a metal cap 40 of any well known type and provided preferably with a sealing disk 41 of cork or other suitable material. The cap rests upon the rim of the bottle with its depending flange 42 surrounding the annular shoulder or bead 43 of the bottle neck. The bottle is supported upon a suitable table and raised thereby into sealing position. As the bottle supporting and lifting means constitute no part of the present invention they have not been illustrated, it being understood that I may avail myself of any well known means for the purpose. The lower end of spindle 7 is formed with a slight recess 7' (see Fig. 1) to constitute a chuck, the internal diameter of said chuck and its configuration being such, relatively to a standard size and shape of bottle rim and cap, as to apply a uniform and evenly distributed pressure upon the cap and around the over-lying corner thereof and to effect a reshaping of the cap into exact conformity with the rim of the bottle. This results when the bottle is forced upwardly into and against the chuck, the plane of impact extending over the corner of the cap. At the same time the sealing disk 41 is compressed over the rim of the bottle.

In Figs. 1 and 3 the parts are shown in position at the moment of impact of the bottle against the chuck, it being noted that in such position the shoes 24 rest against the flange 13 of pulley 12. The further upward movement of the bottle raises spindle 7 against spring 31 tending to compress the latter until the bottle reaches its uppermost position.

When the spindle 7 is thus raised it carries with it pulley 12 and the parts connected thereto causing the shoes 24 to ride over the cam face 6'. The arm 23, spindle 15 and collar 16 being rigidly secured together the effect of a shoe 24 contacting with cam 6' is to impart a slight rotary movement to spindle 15 causing the corresponding sealing roller to project through its opening 38 in the neck of the guide 36 and to yieldingly bear against the depending cap flange. The pulley 12 being rotated the sealing rollers 20 will be moved around the cap flange, the working edges 20' of said rollers bending the flange 42 into secure locking engagement with shoulder 43 so as to present a perfectly true and smooth surface without bending or folding of the metal.

It will be noted that the sealing rollers 20 are supported in normal working relation to the cap flange in a downwardly inclined plane from the bottle neck and that they are permitted to yield in a direction substantially at right angles to their axes of rotation. In practice the angle of inclination may vary from 30 to 50 degrees, the best results having been obtained at an angle of about 45 degrees. This means of presenting the sealing roller to the cap flange has many advantages over any sealing machine with which I am familiar, the principle being that the sealing tool is enabled to reach in under the shoulder 43 working with a yielding pressure in a downwardly inclined plane with a rolling motion.

The angle of the cam face 6' is such as to move the sealing roller a sufficient distance to cause it to bear against the cap flange with force enough to bend said flange under shoulder 43, the spring 21 holding the sealing tool in working position and permitting it to yield when meeting any inequalities in the shoulder or variations in the width of bottle necks. The working edge 20' of the sealing roller strikes the cap flange at or near the edge thereof as indicated in Fig. 4.

Owing to the manner of mounting the sealing tool whereby it remains in fixed relation to the spindle 7 the inward movement of said tool due to cam 6' is the only movement necessary to bring it into working position; this being true whatever the height of the bottle may be. In practice bottles of a given type vary in height as much as one and one-half inches and the cam face 6' is made to meet such conditions; that is, the cam 6' is made of sufficient length to position the sealing tool for the bottle of least height of a given type liable to be met with in practice. The cam 6' should also be of such shape as to throw the sealing tool far enough to insure the sealing of a cap of the smallest diameter of neck of a given type. If only one tool is used the roller should be maintained in sealing operation by the cam during at least one complete revolution around the neck of the bottle. After passing the cam 6' the shoes 24 rest against the outer wall of sleeve 6.

In the present specification I have used the word "bottle" for convenience of description as meaning any form of receptacle having a shoulder or bead about its head and which is adapted to be closed by bending the flange of a sealing cap into locking relation with said shoulder.

What I claim and desire to secure by Letters Patent is:—

1. A head for a bottle sealing machine comprising a sealing tool adapted to bend the flange of a cap into locking relation with a shoulder on the bottle, a support for said tool, the latter being mounted in its support in a plane downwardly inclined from the bottle and maintained at substantially a fixed angle of inclination to the axis of the bottle during the sealing operation, a spring to yieldingly hold said tool to its work, and means for rotating the tool about the bottle head.

2. A head for a bottle sealing machine comprising a sealing tool adapted to bend the flange of a cap into locking relation with a shoulder on the bottle, a support for said tool, the latter being mounted in its support in a plane downwardly inclined from the bottle, a spring bearing against said tool and adapted to be compressed when the latter is pressed against the cap flange to thereby hold said tool yieldingly to its work, and means for rotating said tool about the bottle head.

3. A head for a bottle sealing machine comprising a sealing tool adapted to bend the flange of a cap into locking relation with a shoulder on the bottle, a support for said tool, the latter being mounted in its support in a plane downwardly inclined from the bottle, a spring mounted in the support immediately back of the tool and adapted to be compressed when the sealing tool is pressed against the cap flange to thereby hold the tool yieldingly to its work, and means for rotating said tool about the bottle head.

4. A head for a bottle sealing machine comprising a sealing tool adapted to bend the flange of a cap into locking engagement with a shoulder on the bottle, a support for said tool, said tool being mounted in its support in a plane downwardly inclined from the bottle and maintained at substantially a fixed angle of inclination to the axis of the bottle during the sealing operation, a spring to yieldingly hold said tool to its work, means for swinging said tool laterally toward and away from the bottle head, and means for rotating said tool around the bottle head.

5. A head for a bottle sealing machine comprising a tool having a peripheral flange constituting the working edge thereof, a support for said tool, said tool being mounted in its support in a plane inclined downwardly from the bottle at substantially forty-five degrees, a spring bearing against said tool to hold the latter yieldingly to its work, means for swinging said tool laterally toward and away from the bottle, and means for rotating said tool around the bottle head.

6. A head for a bottle sealing machine comprising a sealing tool held in normal working relation to the cap flange in a plane at an angle to a horizontal plane, a pulley on which said tool is supported and means for rotating said pulley and thereby said tool around the bottle head.

7. A head for a bottle sealing machine comprising a sealing tool revolubly mounted in a plane at an angle to a horizontal plane, and means to permit said tool to yield in said plane in a direction substantially at right angles to its axis of rotation.

8. A head for a bottle sealing machine comprising a longitudinally movable spindle the end of which constitutes a chuck to receive the bottle, a pulley mounted on and movable with said spindle, a sealing tool carried by said pulley said tool being held in normal working relation with the cap flange in a plane at an angle to a horizontal plane, means to move said tool into working relation with the cap flange, and means to rotate said pulley.

9. A head for a bottle sealing machine comprising a spindle the lower end of which constitutes a chuck to receive the bottle, a pulley mounted on and movable with said spindle, a sealing tool carried by said pulley, and a guide for the bottle secured to the under side of the web of the pulley.

10. A head for a bottle sealing machine comprising a longitudinally movable spindle, a pulley mounted on and movable with said spindle, a spindle rotarily mounted in a bearing on said pulley, a sealing tool carried by said latter spindle in a plane at an angle to a horizontal plane, means to rotate said last named spindle to thereby move the sealing tool into working relation with the cap flange, and means to rotate said pulley.

11. A head for a bottle sealing machine comprising a longitudinally movable spindle a pulley mounted on and movable with said spindle, a spindle rotarily mounted in a bearing on said pulley, a sealing tool and an arm carried by said latter spindle, said tool being held in normal working relation to the cap flange in a plane at an angle to a horizontal plane, a shoe mounted in said arm, a cam over which said shoe is adapted to ride to thereby move the sealing tool into working relation with the cap flange, and means to rotate said pulley.

12. A head for a bottle sealing machine comprising a longitudinally movable spindle, a tool support mounted on and movable with said spindle, a sealing tool carried by said support and suspended below the lower end of said spindle, a guide for the bottle secured to said support, said guide being provided with openings to permit of the movement of said tool into working relation with the cap flange, and means to rotate said support.

13. A head for a bottle sealing machine comprising a plurality of sealing tools held in normal working relation to the cap flange in the same fixed plane at an angle to a horizontal plane, and means for moving said tools to effect the desired bending of said flange.

In testimony whereof I have hereunto signed my name in the presence of two subscribing witnesses.

ALFRED L. WEISSENTHANNER.

Witnesses:
   R. W. ASHLEY,
   CHARLES S. JONES.